United States Patent [19]
Lambden

[11] Patent Number: 5,704,681
[45] Date of Patent: Jan. 6, 1998

[54] SIDE ACCESS TRUCK CAP

[75] Inventor: James W. Lambden, Guelph, Canada

[73] Assignee: Magic-Cap (U.S.A.) Inc., Metamora, Mich.

[21] Appl. No.: 772,242

[22] Filed: Dec. 23, 1996

Related U.S. Application Data

[63] Continuation of Ser. No. 594,782, Jan. 31, 1996, abandoned, which is a continuation of Ser. No. 387,302, Feb. 27, 1995, abandoned.

[51] Int. Cl.⁶ .................................. B60P 7/02; B60P 3/34
[52] U.S. Cl. ........................................ 296/100; 296/165
[58] Field of Search .......................... 296/10, 100, 164, 296/165, 183

[56] References Cited

U.S. PATENT DOCUMENTS

| | | | |
|---|---|---|---|
| 2,513,140 | 11/1950 | Linde | 296/100 |
| 3,675,885 | 7/1972 | Shute | 296/100 X |
| 3,765,716 | 10/1973 | Van Gompel | 296/100 |
| 4,629,243 | 12/1986 | Jensen | 296/100 |
| 4,768,824 | 9/1988 | Andonian | 296/165 |
| 4,819,981 | 4/1989 | Moe et al. | 296/100 |
| 5,102,185 | 4/1992 | Lake | 296/100 X |
| 5,190,341 | 3/1993 | Simard | 296/100 |
| 5,303,972 | 4/1994 | Heider et al. | 296/98 |
| 5,375,900 | 12/1994 | Tessenyi et al. | 296/100 |

FOREIGN PATENT DOCUMENTS 4026392  2/1992  Germany ................. 296/165

*Primary Examiner*—Dennis H. Pedder

[57] ABSTRACT

An enclosure is described for the box of a pick-up truck. The box of a pickup truck is defined by a front wall, side walls and a rear gate the flat upper surfaces of the box forming a rectangle. The enclosure has a front wall, side walls and a rear gate which have flat lower surfaces and form a rectangle substantially congruent with a box, and mountable atop same. This defines a space enclosed by the box and an enclosure. The enclosure of the present invention is pivotally connectable along a selected side wall thereof to a corresponding side wall of a box, and is characterised in that between the other side wall of an enclosure of the invention and the corresponding side wall of a box is provided a pair of lifting arms to assist in the lifting, and closing, of said enclosure.

2 Claims, 14 Drawing Sheets

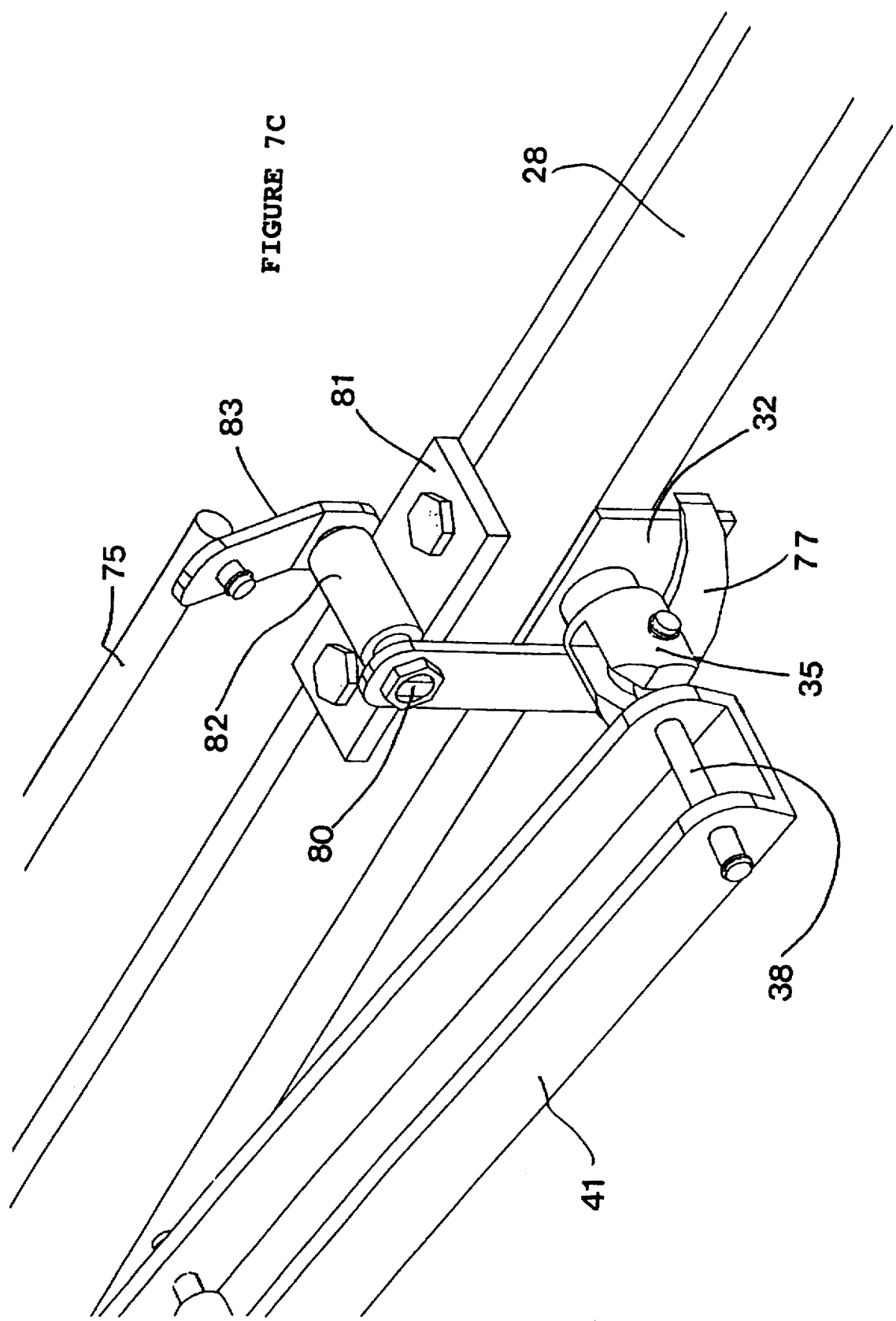

SIDE ACCESS TRUCK CAP

This is a continuation of application Ser. No. 08/594,782, filed Jan. 31, 1996, now abandoned, which is a continuation of application Ser. No. 08/387,302, filed Feb. 27, 1995, now abandoned.

FIELD OF THE INVENTION

The invention relates to truck caps for the cargo box of pickup trucks.

BACKGROUND OF THE INVENTION

Truck caps or toppers are often used to secure the cargo box of pickup trucks. Truck caps are used to protect the cargo area from theft or damage from inclement weather conditions or damage from animals. Truck caps are generally of the same height of the cab of the pickup truck however some provide for more height for the entire box or more height at the rear section of the cap around the cargo door to provide more room for the unloading and loading of cargo. The cargo is often too large to enter the back door of the cap due to the lintel at the top of the door. An operator must stoop over to access anything from the box of the pickup truck due to the fact that the overall height of the cap from the box floor to the cap ceiling is about half the height of the typical person.

DESCRIPTION OF THE PRIOR ART

Pickup truck caps or toppers are commonly used to enclose the truck box of light pickup trucks. Normally they are fastened to the cargo box using nuts and bolts or clamp type devices. A variety of mechanisms have been invented to lift the cap up from the back or the side of the box employing hinges and catches in a vast array of attachment kits.

Most pickup truck caps manufactured today are dependent on the truck box for their structural integrity. Quite often they are manufactured using chopped fibreglass with lower perimeter rails manufactured from fibreglass over wood or aluminum base rails riveted onto the fibreglass. They make no allowances for being completely structurally independent, an absolute requirement for a cap to be lifted safely over the duration of its life span—typically up to 10 years.

Other inventions, particularly the one disclosed in U.S. Pat. No. 5,131,712 provide for a reinforcement kit inclusive of a torsion bar or other torsional reinforcement to the cap due to the unbalanced forces acting on the cap by their lifting mechanism.

Of overriding concern to the development of the lifting truck cap should be its overall safety under all conditions. A truck cap, when lifted, is an ideal wind scoop. The cap is continually subject to winds in excess of 55 mph. Occasionally, high winds can remove a cap from its mounting position if its mounts fail or due to the failure of the fibreglass itself.

Another common disadvantage of caps covered by known patents in respect of add-on kits, is failure to optimize the efficiency of the materials being used. The kits have to be overly strong and as a consequence heavy. This also makes them relatively expensive to manufacture. Locking mechanisms are sometimes absent and some of the prior art requires the operator to supply a padlock. Still other patents require the drilling of holes in the pickup truck itself for an attachment means.

The invention herein aims to address the foregoing problems by providing for an integrated cap and lifting mechanism.

SUMMARY OF THE INVENTION

In one broad aspect, then, the present invention relates to an enclosure for the box of a pick-up truck, said box being defined by a floor, front wall, side walls and a rear gate the flat upper surfaces of said box forming a rectangle, said enclosure having a roof, front wall, side walls and a rear gate and having flat lower surfaces, forming a substantially congruently rectangle with a said box and mountable atop same to define a space enclosed by said box and said enclosure, said enclosure being pivotally connectable along a selected side wall thereof to a corresponding side wall of said box, characterized in that between the other side wall of said enclosure and the corresponding side wall of said box is provided with a pair of lifting arms to assist in the lifting, and closing, of said enclosure.

The above objectives and others will be described in more detail in the ensuing discussion of the preferred embodiment of the invention.

BRIEF DESCRIPTION OF THE DRAWINGS

FIG. 7c is a detail view of the latch hook mechanism shown in FIG. 7;

DESCRIPTION OF THE PREFERRED EMBODIMENT

Figure 1:
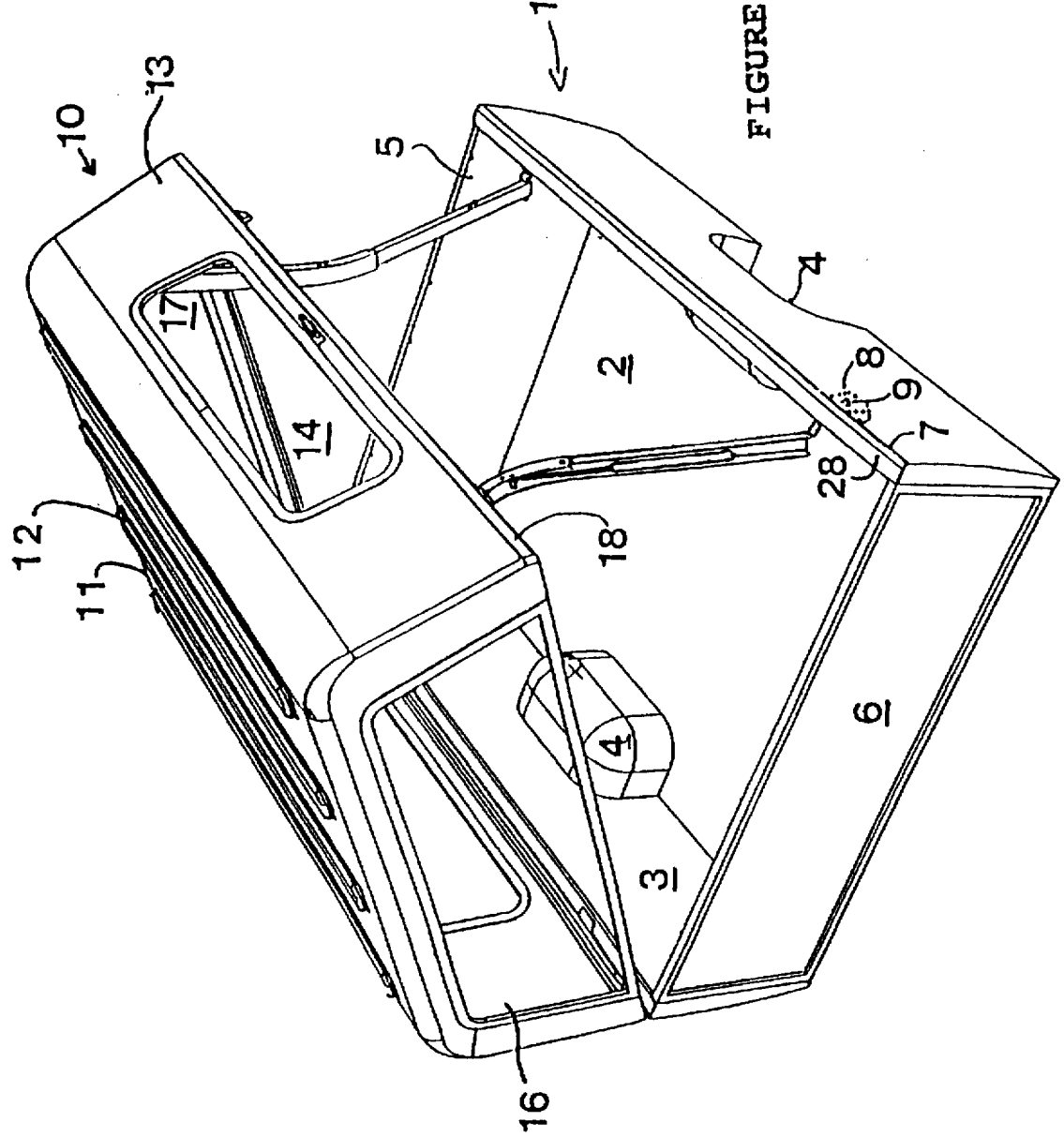
FIG. 1 is a perspective view of the cap of the present invention attached to a truck bed and in the open position.
Figure 2:
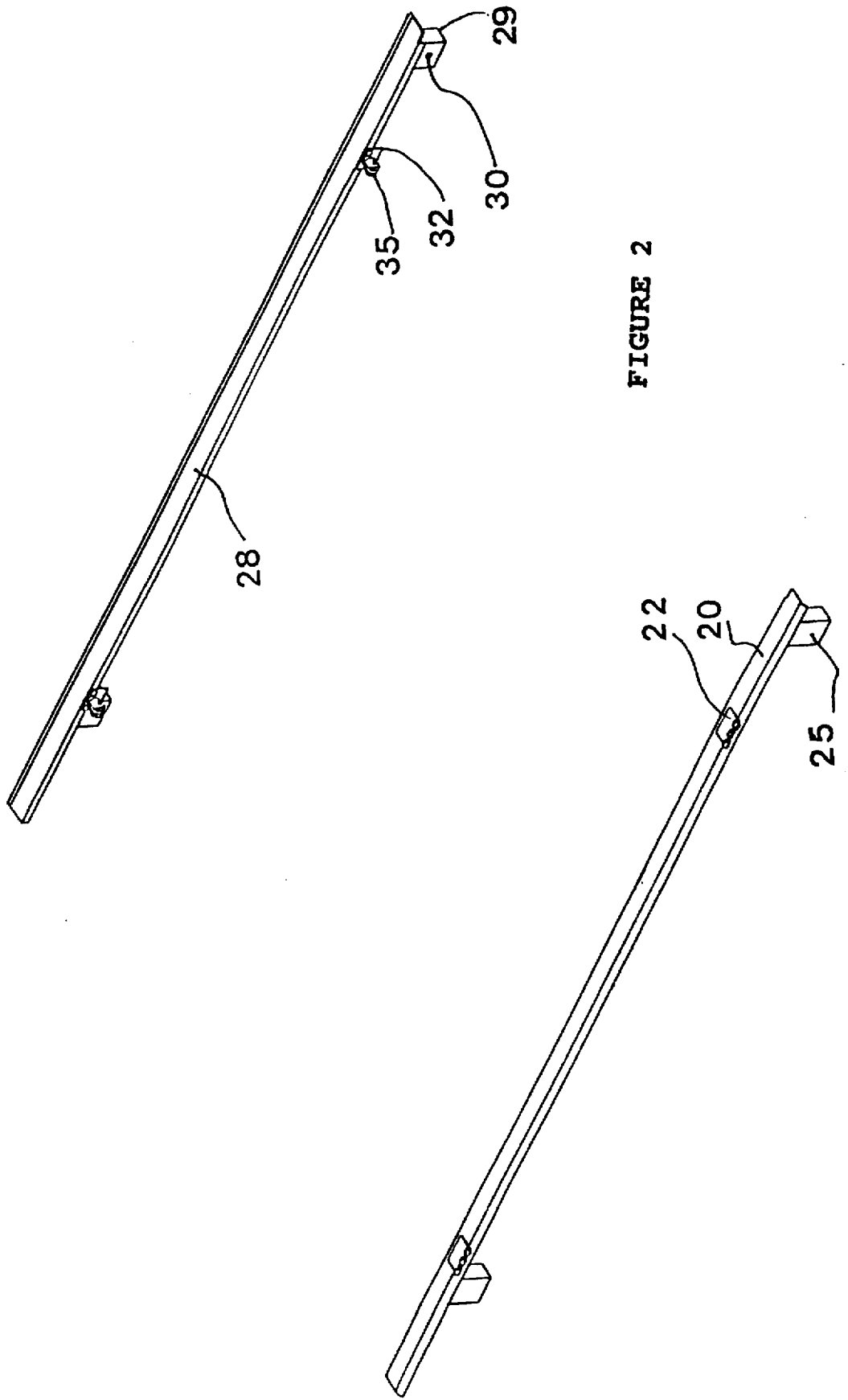
FIG. 2 is a perspective view of the truck box rails utilized in connection with the cap of the present invention.
Figure 3:
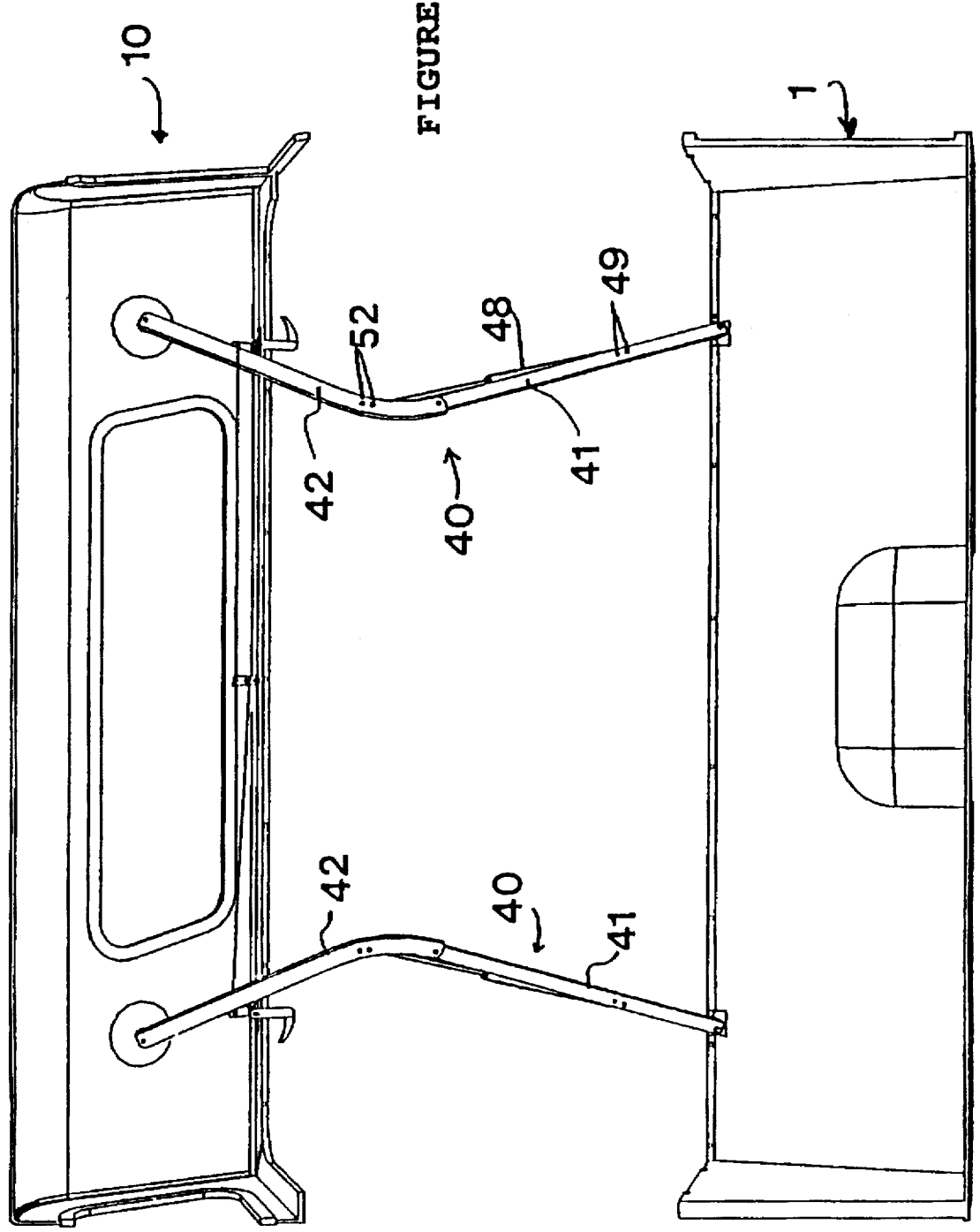
FIG. 3 is a view from inside the cap of the present invention, in the 'open' position, of the lifting and latching mechanism thereof.
Figure 4:
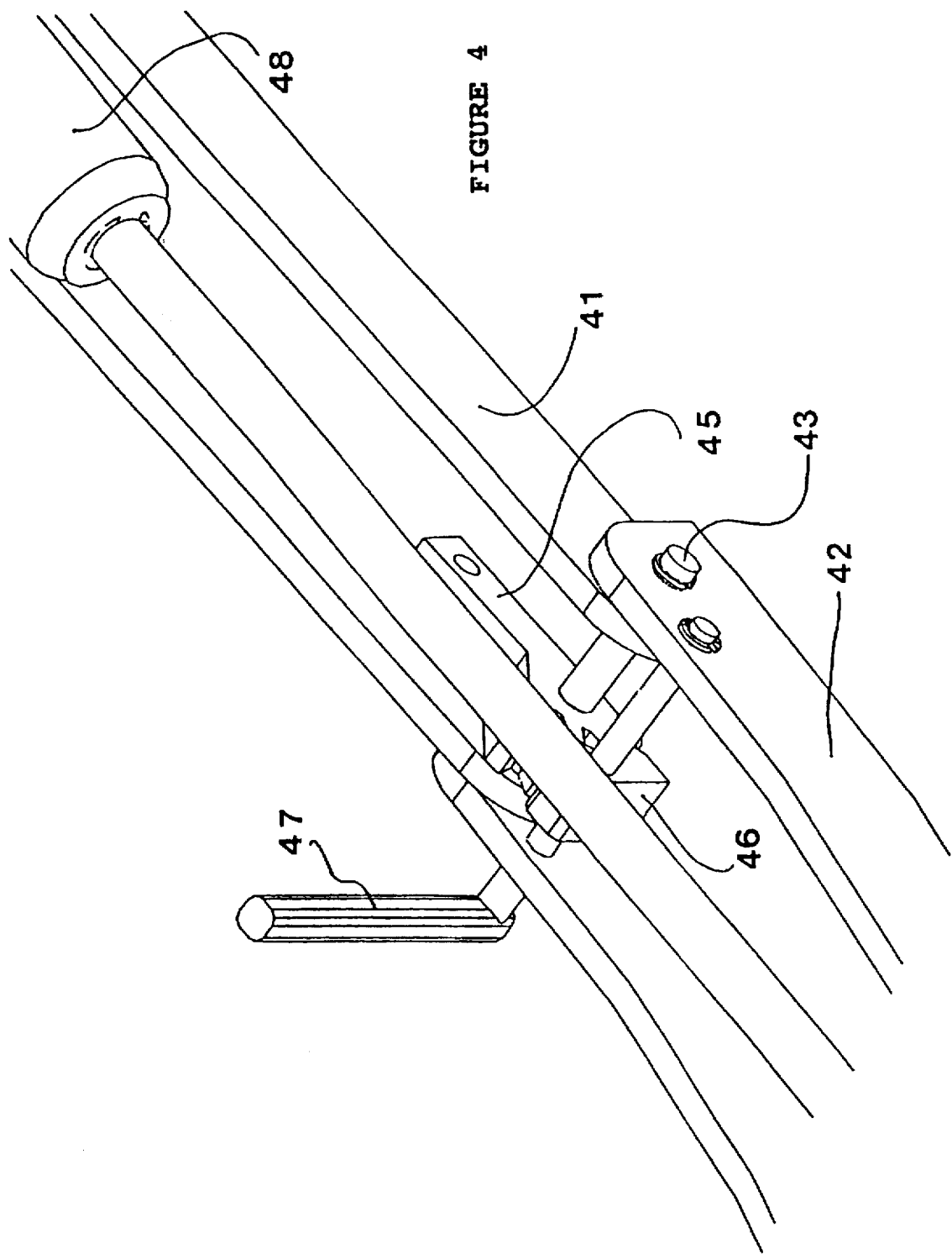
FIG. 4 is a detail view of a lifting arm utilized in connection with the cap of the present invention at the hinge thereof.
Figure 5:
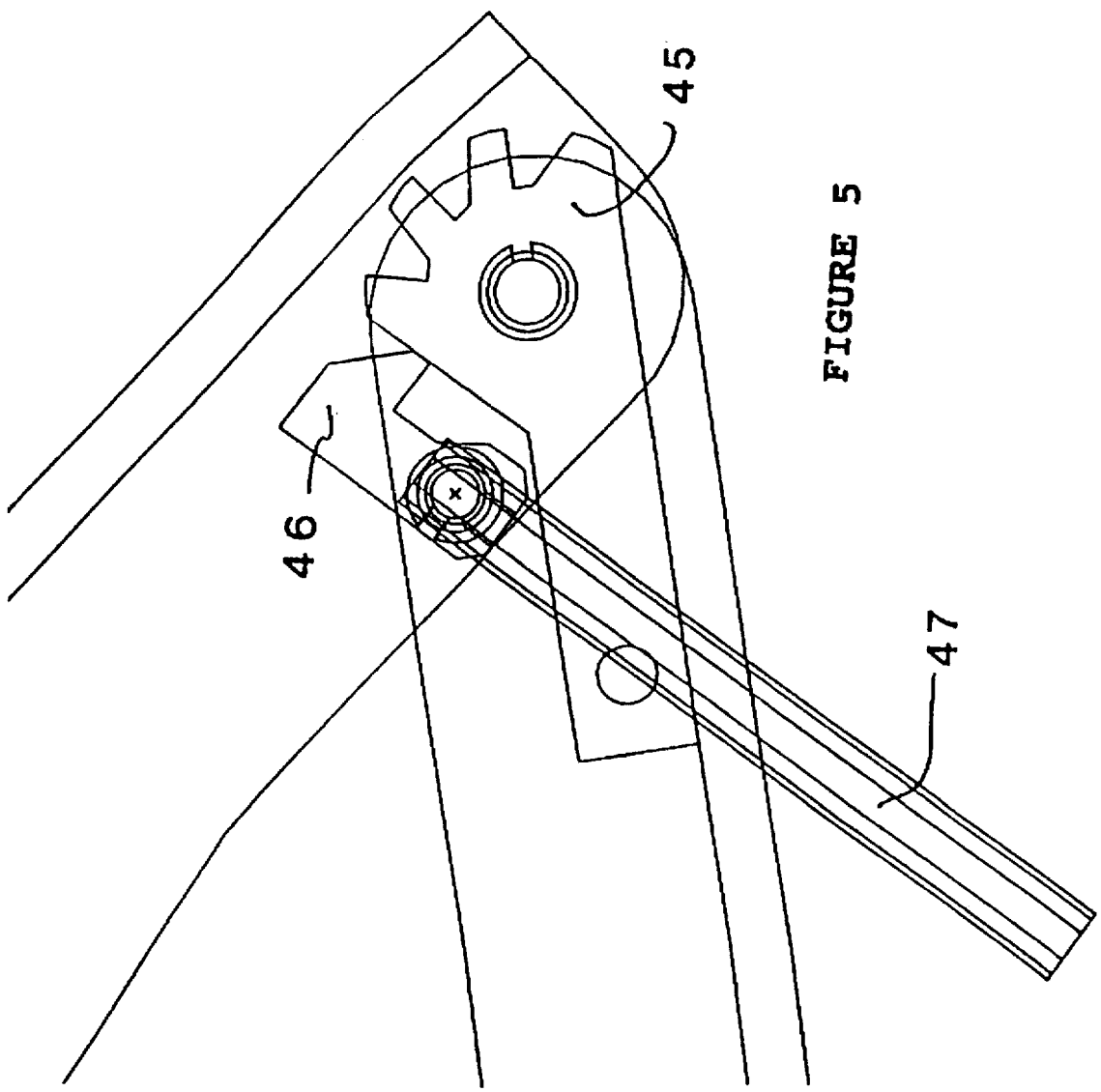
FIG. 5 is a side view, partially in phantom of the ratchet mechanism shown in FIG. 4.
Figure 6:
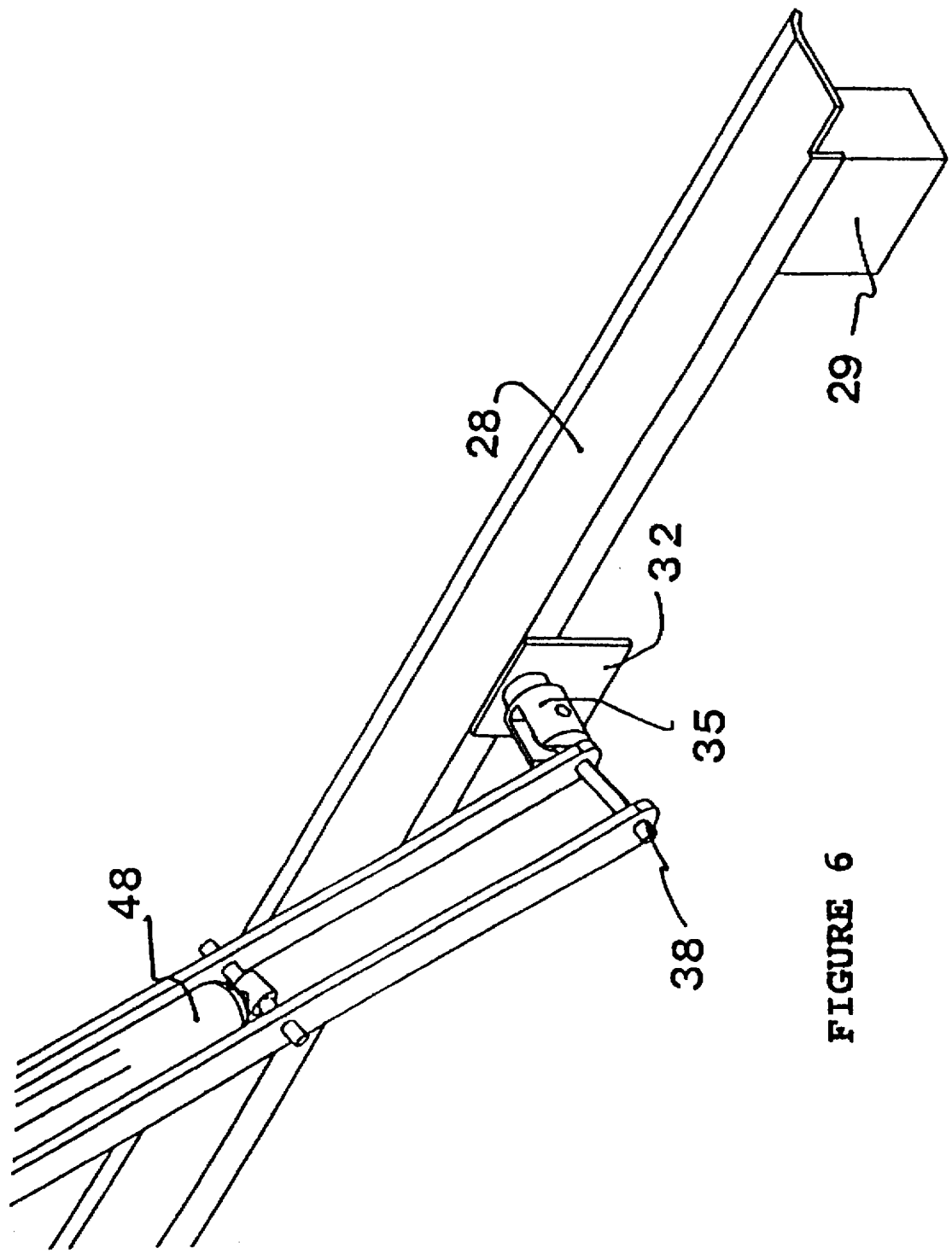
FIG. 6 is a perspective view of the attachment joint between the lifting arm of FIG. 4 and a rail of FIG. 2.

Referring to the drawings, the cargo box 1 of a pickup truck includes a box floor 2 upwardly extending from which are side walls 3, wheel wells 4, and a front wall 5. The cargo box is accessible through rear tail gate 6. Around the upper perimeter of the cargo box is an upper rail 7 in which are located stake pockets 8. The stake pockets are square recesses extending downwardly from the upper rail 7 along the inside of the side wall 3. A transverse hole or holes 9 are provided through the interior of the wall 3, intersecting the lower part of the stake pocket.

The side access truck cap of the present invention is downwardly open with a roof 11, two opposing parallel sidewalls 13 and a front wall. The cap has an integral rail section 18 around the perimeter of the base of the front and side walls. The cap has front 17 and rear 16 windows and side window 14. Protruding from and running from near the rear section to the front section of the roof of the cap are longitudinal external ribs 12. The ribs provide for structural reinforcement of the cap and as a mounting position for roof loading. The inside surface of the cap is also provided with ribs, particularly around the rear access door on which the rear window 16 is mounted. The internal jibs extend transversely to the external ribs 12.

Upper hinge leaves are attached to the bottom rail section 18 of one side of the cap 10 such that the exterior of the barrel of the hinges are flush with the side wall of the cap 10.

The hinge permits angular displacement of the cap 10 with respect to the truck box 1. The axis of rotation is generally parallel to the longitudinal axis of the truck at the outside top of the truck box 1.

A hinge rail 20 is formed of steel such that the interior of the hinge rail 20 is dimensioned slightly larger than the box rail, to fit against same in a mounted position. A rubber seal is provided between the hinge rail 20 and the box rail 7 and prevents ingress of water. The seal protects the exterior surface of the box rail 7. Protruding downwardly from the hinge rail 20 are stake pocket inserts 25, such that the inserts fit snugly into the stake pockets 8. A lower hinge leaf 22 is mounted to the hinge rail such that the barrel of the hinge is flush with the outer edge of the hinge rail 20.

The lower hinge leaf 22 is attached to the upper hinge leaf by a hinge pin. The pin has a head, shaft and recess near the end furthest from the head around which a clip is fastened to prevent the pin from coming out of the hinge barrel.

Flush mounted into the side of the hinge rail stake pocket insert is a nut 30 in a position such that it aligns with the stake pocket hole 9. A bolt passes through the stake pocket hole 9 and into the nut such that it affixes the hinge rail 20 to the box rail 7.

On the opposite side of the box, there is provided a lifting rail 28, formed of steel such that the interior of the lifting rail 28 is of a dimension slightly larger than the exterior dimensions of the top of the box rail 7 and the lifting rail 28 mounts around and juxtaposed to the box rail 7. A rubber seal is mounted between the lifting rail 28 and the box rail 7. The seal protects the exterior surface of the box rail 7. Protruding downwardly from the lifting rail 28 is a stake pocket insert 29 such that the insert fits snugly into the stake pocket 8.

Flush mounted into the side of the lifting rail stake pocket insert 29 is a nut in a position such that it aligns with the stake pocket hole 9. A bolt passes through the stake pocket hole 9 and into the nut such that it affixes the lifting rail 28 to the box rail 7.

Protruding downwardly from the inside of the lifting rail 28 is a plate 32, having a centrally located bolt hole. A bolt passes through the hole and into the end of a lift arm attachment joint 35.

The lift arm attachment joint 35 is generally cylindrical with the end mounted on the lifting rail 28 of a smaller diameter than the end to which the lifting arm lower link 41 is attached. The smaller end acts as a catch to the latch hook.

The end to which the lifting arm lower link 41 is attached is machined to provide for a slot into which the lower lift arm link attachment pin 38 is positioned. A hole is drilled through the end of the joint 35. A hole is drilled through the end of the attachment pin 38. A pin pivotally attaches the attachment pin 38 to the joint 35. A clip holds the pin in position.

The lifting arm lower link 41 has a hole in its lowermost end through which the attachment pin 38 passes. The attachment pin 38 is held into position by a clip. It will be understood then that attachment pin 38 with attachment joint 35 will together function as a universal joint permitting angular displacement of lifting arm 40 in three dimensions.

The lifting arm 40 is comprised of a lower link 41 and an upper link 42 and a gas spring 48. The lower link 41 is of channel material such that the exterior dimensions of the channel are slightly smaller than the interior dimensions of the upper link 42. The end of the lower link fits into the end of the upper link and the two links are pivotally attached to each other by a pin 43 and the pin is held in place by a clip. Inside the lower link is a ratchet insert 45 and mounted on the upper link is a ratchet tab 46. When the arm is in one of several predetermined positions, including the extendedmost position of the arms, with the cap fully open, the tab 46 catches the ratchet 45 and locks the arm thus preventing premature closure of the cap. The tab 46 is connected by a bolt through the side of the arm to a handle 47 that is spring biased toward a closed position to maintain the tab in a locked position. To unlock the tab from the ratchet, the handle is pressed to an open position, moving the tab out of engagement with the ratchet.

Figure 10:
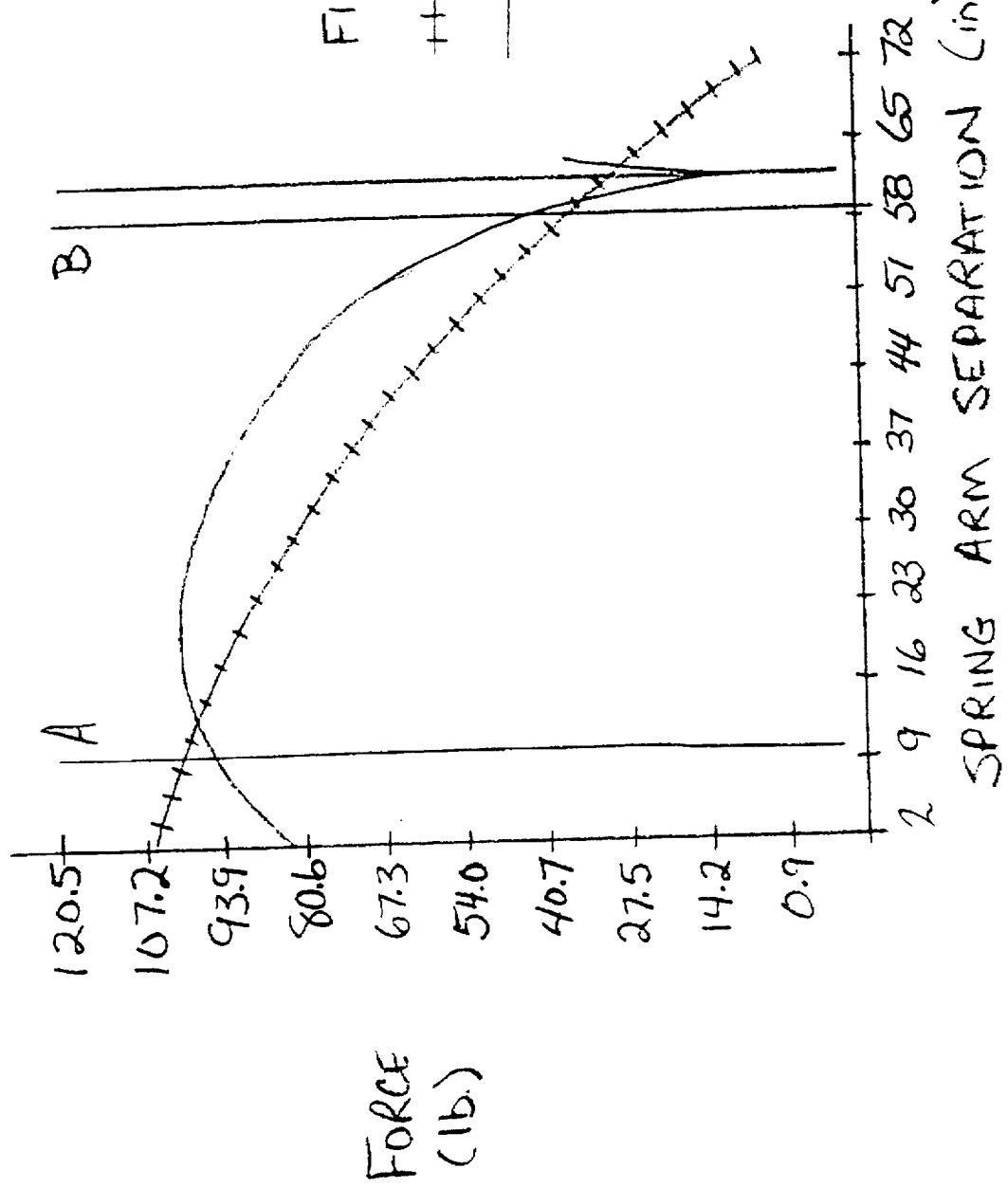
FIG. 10 is a graph illustrating the force required to open a cap of the present invention, and the force generated by the spring arms of the present invention at a variety of open widths of the cap.

The upper lift arm is bent at an angle. The size and location of the angle affects the overall lifting force of the arm. The lifting force of the arm is such that it matches the force curve required to lift a cap of given dimensions, as shown in FIG. 10. Moreover, it will be noted that the lifting force the arm spring generates is preferably, as illustrated in FIG. 10, slightly less than the force required to lift the cap when the cap is in a closed position, to prevent the cap from accidentally springing open. In an open position, observable from the right side of the graph, the force generated by the spring is slightly greater than the downward force of the cap to prevent accidental closure should the ratchet mechanism malfunction.

The gas spring 48 is pivotally attached to the lower link 41 by a pin 50 which passes through a hole 49 and held in place by a clip. The gas spring is pivotally attached to the upper link 42 by a pin 53 which passes through a hole 52 and held in place by a clip. The gas spring 48 is attached to the upper link 42 near the angle and to the lower link 41 at the position corresponding to the end of the gas spring 48 in its fully extended position and the arm 40 in its fully extended position. Two sets of holes 49 and 52 are provided for as an adjustment to the overall force created by the arm 40.

The upper link 42 is pivotally attached to a universal swivel pin 55 which is held in place by a clip. The universal swivel pin allows for pivotal movement around an axis central to its shaft and around an axis perpendicular to its shaft at one end where a hole passes through it. The upper link 42 pivots around the axis central to its shaft. The universal swivel pin 55 is pivotally mounted to a joint 60 by a pin extending through the joint 60 transverse to the pin 55. The joint 60 is cylindrical in Shape with a slot cut out of one end and a hole passing through the tabs on either side of the recess. Tapped into the other end of the joint are threads. The joint 60 is attached to a plate 57 by a bolt which passes through a hole in the centre of the plate 57 and into the threads in the joint 60.

The plate 57 has several holes 59 passing through it that allow it to be moulded into the fibreglass of the cap 1. The resins and fibres of the fibreglass join through the holes 59 making the plate an integral part of the cap 1.

The cap 1 is held in its closed position by a hook 77 accessed from the outside by a latch handle 64. The latch handle is of a locking type with a tumbler and a key. The latch handle 64 is located on the outside of the cap and the shaft of the latch handle 64 passes through the cap and is pivotally attached to a plate 65 which is mounted on the inside upper face of the cap rail 18 by two bolts. The end of the shaft of the latch handle is attached central to an elongated plate 68 with a hole in either end.

Figure 7:
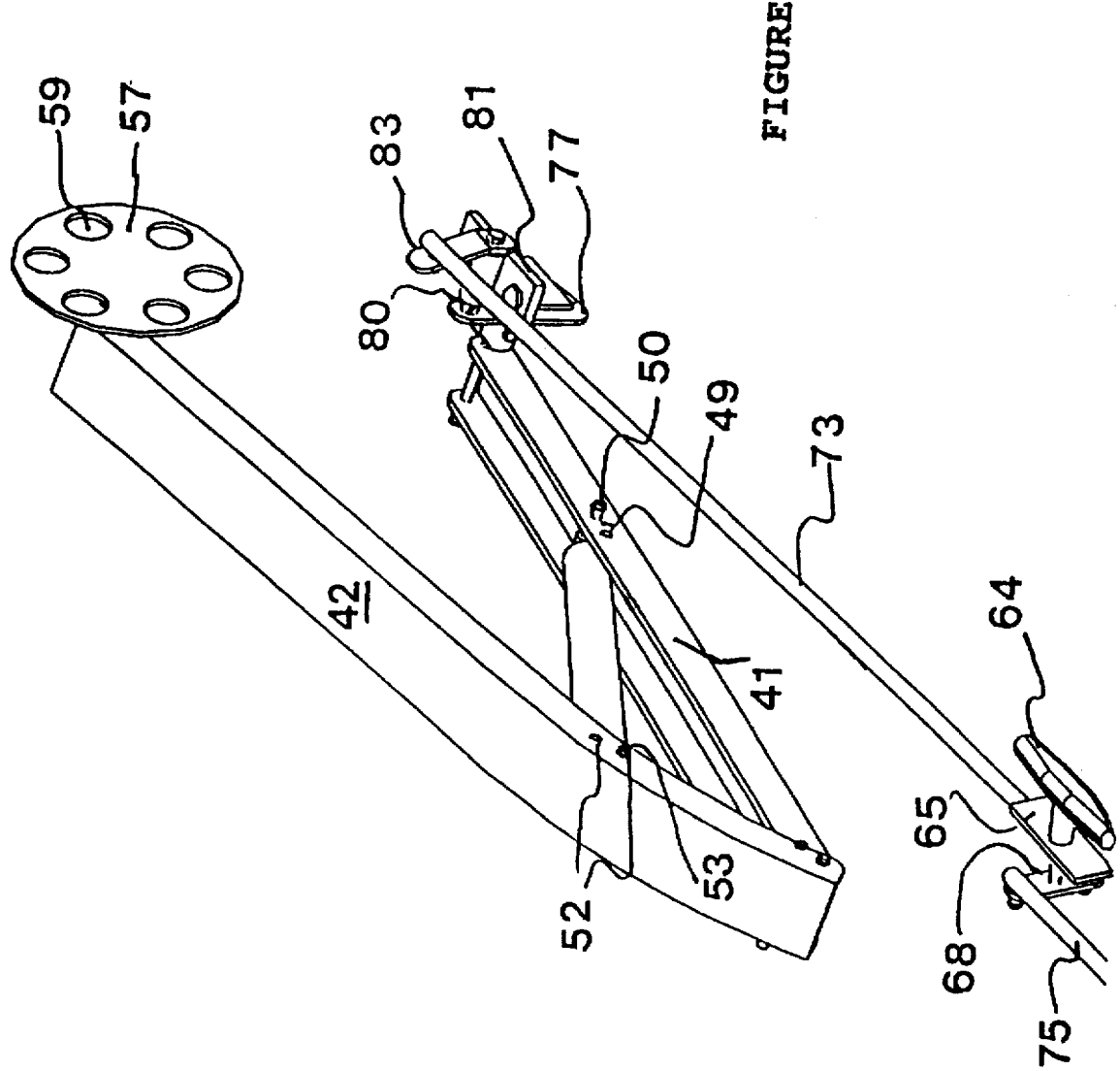
FIG. 7 is a perspective view of a lifting arm of FIG. 4 and the joint between same and a disc adapted for incorporation into a fibreglass body of a truck cap.
Figure 7A:
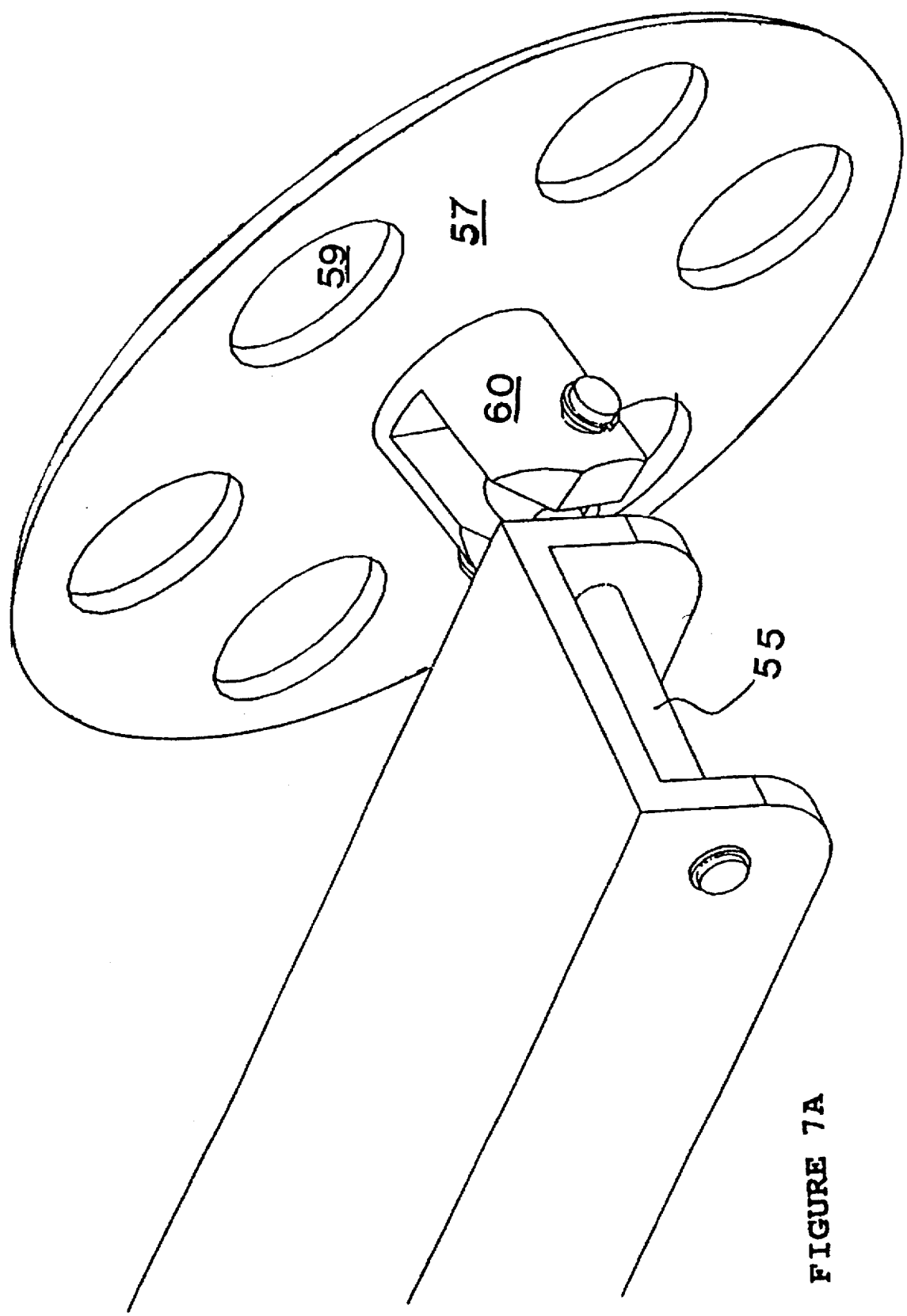
FIG. 7a is a detail view of the end of the arm shown in FIG. 7, and the disc thereof.
Figure 7B:
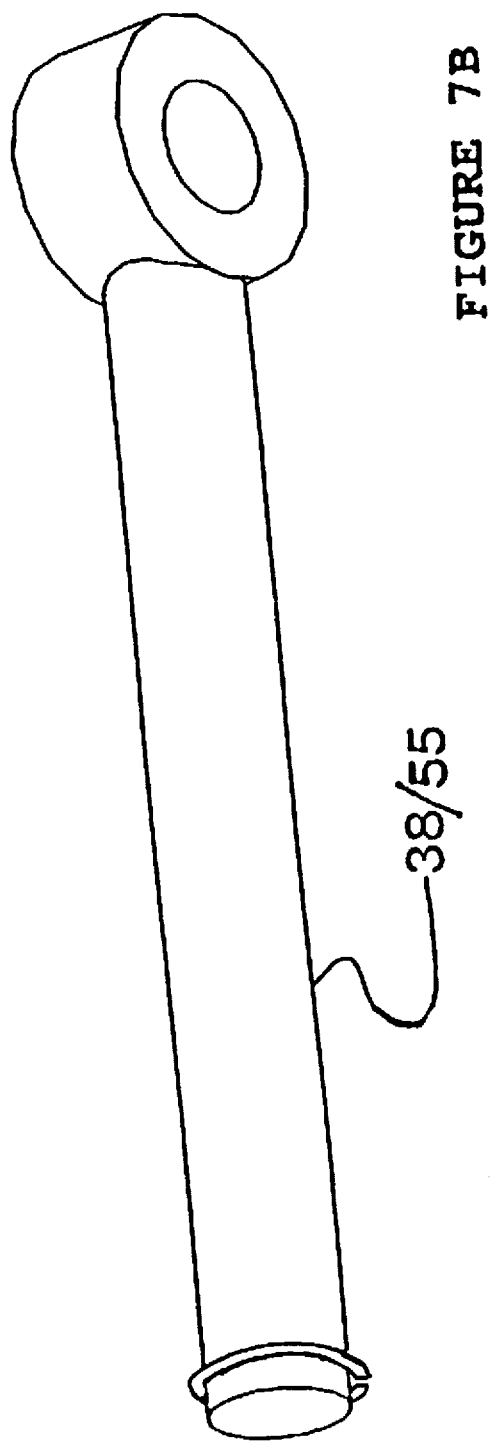
FIG. 7b is a detail view of the pin 55, 38 in the joints between the lifting arm of FIG. 7 and the cap or truck box.

Two rods 73 and 75 connect the latch hooks 77 to the elongated plate 68. Each rod has its ends bent perpendicular to its shaft. One end of each rod is pivotally attached through the holes in the ends of the plate 68 and held in place by a clip. As can best be observed in FIG. 7c, the latch hook 77 is linked by a bolt 80 to a plate 83 pivotally connected to the end of a rod 73 or 75. Bolt 80 is rotatable in a tube 82 mounted on a plate 81. Plate 81 is connected directly to the cap rail 18.

Turning the handle thus turns both hooks and releases the cap from its lowermost position. The hooks are located such that when the arms are in their fully extended position they are in close proximity to the arms thus preventing persons from hitting their heads on the hooks.

Figure 11:
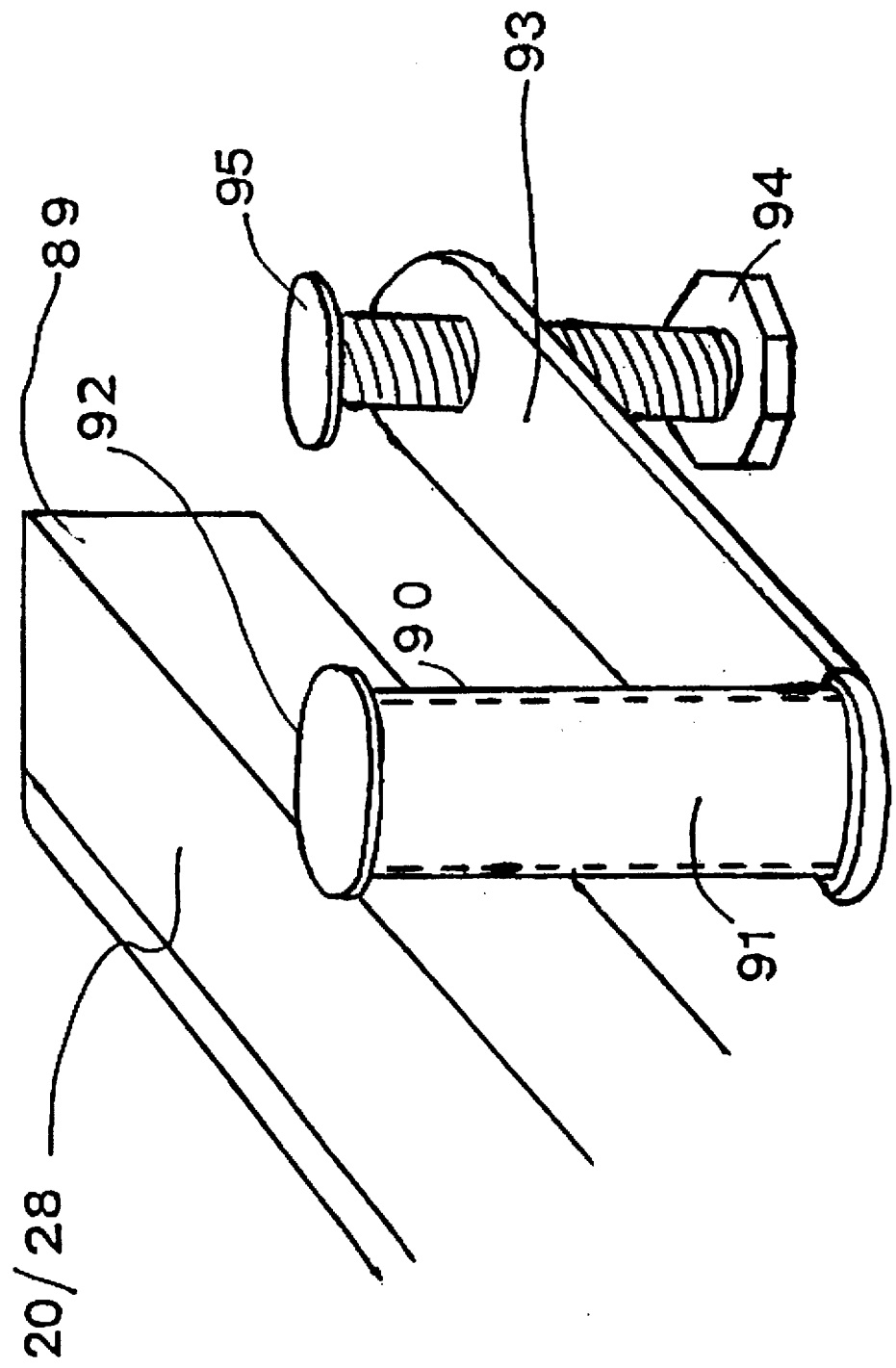
FIG. 11 is a perspective view of an alternating embodiment of the hinge and lifting rails of the present invention, for attachment to truck boxes that are not provided with stake pockets.

In the case of application to a truck body in which no stake pockets are provided, the rail is formed as shown in FIG. 11 such that at the ends, two tabs 89 will be formed and bent downwards to prevent forward backward sliding of the rail.

The rail in such a case has a round tubular section 90 welded onto the side of the rail. A shaft 91 at one end is attached to a flat tab 93. The shaft 91 passes through the tube 90 and is held in place by a clip 92. A hole passes through the other end of the tab and threads are tapped into the hole. A bolt 94 passes through the tapped hole. A washer is pressed onto the end of the bolt. To attach the rail to the truck with no stake pockets, the clamp is rotated under the rail and tightened.

In another embodiment of the present invention, the two lifting arms may also be joined onto the same two universal joints to provide for a single centrally located spring. Such an embodiment is appropriate for a short bed truck cap.

Due to the fact that the lifting spring or spring arms lift the cap at balanced points on the cap, the cap has no torsional forces acting upon it. The cap needs no steady strut because the arms lock by the ratchet mechanisms. This provides for safer easier opening and closing of the cap and the lifting arms perform the function of steady struts. In order to better illustrate this, reference is again made to the graph of FIG. 10. In closed position 'A', the downward forces of the cap weight exceed the lifting forces of the arms, but this is reversed in open position 'B'. However, at no point in the graph is there a large disparity between these two forces, so that at all times, the cap may be easily manipulated.

In another aspect of the invention, the cap is equipped with a detector of electromagnetic signals which are generated by a hand held actuator. The detector controls an electric switching device for two electric linear actuators. The cap is not equipped with an exterior handle in such an embodiment. The first linear actuator is attached to the cap by way of a mount moulded into the fibreglass on one end and to the plate 68 to which the two rods 73, 75 are connected. The cap is not equipped with a ratchet mechanism at the midpoint of the lifting arms. The second actuator is activated when the first actuator comes to the end of its first cycle and unlatches the hooks 77 from engagement with the lift arm attachment joint 35. The second actuator is located in place of one of the gas springs 48 and lifts the cap to a desired position. On closing of the cap, the electrical switching device is activated and causes the first actuator to reverse its position thus locking the cap. Due to the fact that the configuration of the arm provides for accurate counterbalancing, it is not necessary to have an actuator on both arms. The movement of the one arm causes the other to follow.

Figure 8:
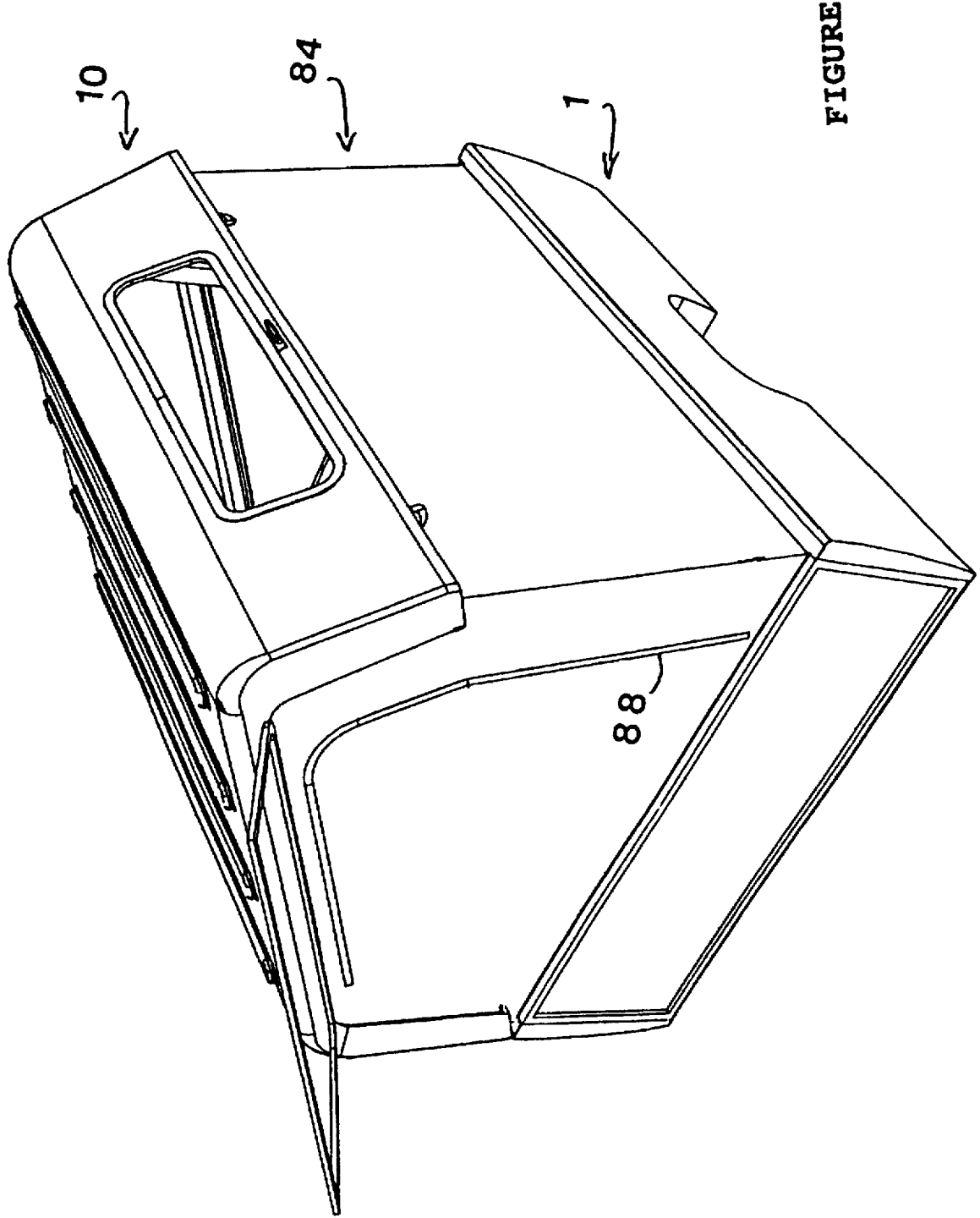
FIG. 8 is a perspective view of an alternate embodiment of the truck cap of the present invention, employing a fabric cover between the perimeter thereof and the truck box.
Figure 9:
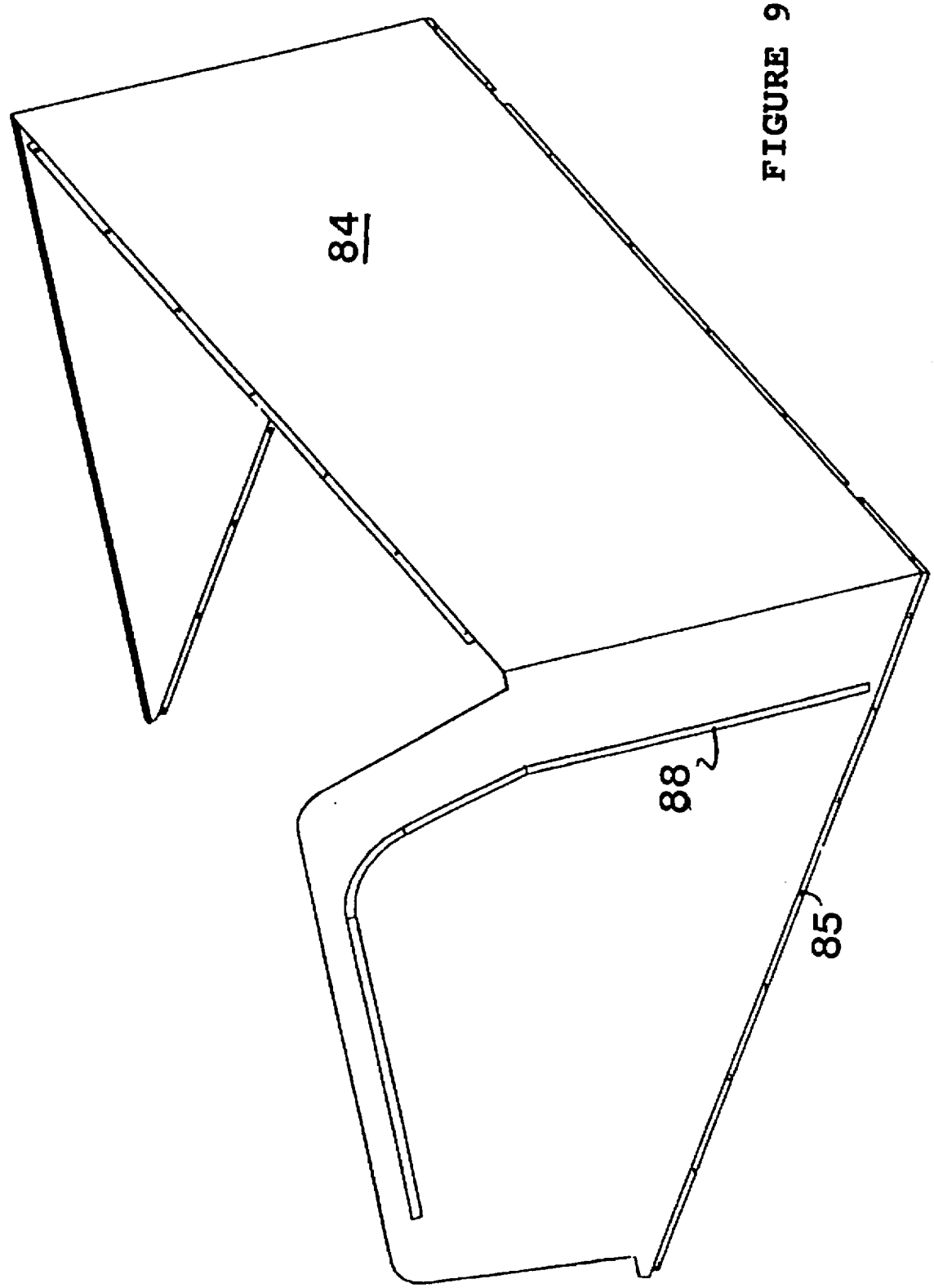
FIG. 9 is a perspective view of the fabric cover shown in FIG. 8.

Referring lastly to FIGS. 8 and 9, the present invention also provides a flexible fabric enclosure 84 which may be removably attached between the lowermost edge 18 of the cap 10 and the upper edge of the box 1. Attachment of the enclosure 84 to the cap and box may be by any suitable fastening means such as the snap fasteners 85 illustrated in FIG. 9 which will of course, align with corresponding snap fasteners built into the corresponding structures on the cap and body. Other suitable fasteners will include VELCRO™ strips, or other fasteners known in the art. As illustrated in FIGS. 8 and 9, a zipper 88 is provided at the end of the enclosure 84 to provide access to the interior thereof.

The snaps are located on the inside of the lift rail generally for aesthetic purposes. To prevent ingress of water a flap is sewn onto the cover and drapes down past the upper outside edge of the box (not illustrated). A plastic window may also be provided for in the side or rear of the tarpaulin enclosure and may also unzip for a screen through which air may circulate.

It is to be understood that the examples described above are not meant to limit the scope of the present invention. It is expected that numerous variants will be obvious to the person skilled in the field of the present invention without any departure from the spirit of the invention. The appended claims, properly construed, form the only limitation upon the scope of the invention.

We claim:

1. A truck box cap comprising:

an enclosure hingedly attached along one side thereof to a hinge rail section mountable upon one side wall of a truck box;

a pair of lifting arms, said arms each being mounted an opposite side of the truck box cap by a universal joint and mounted to a lifting rail by another universal joint, the lifting rail attachable to an opposite side wall of the truck box;

said arms each pivoting about said respective universal joints generally transverse to both said opposite truck box sidewall and to said opposite side of said cap, said arms folding into an orientation generally longitudinally aligned with said lifting rail so as minimize protrusion into the inside of the enclosure in its closed position with the lifting rail and cap juxtaposed;

said arms each being comprised of two sections, one substantially straight at one end section, the other having a curved end section, said two sections being pivotally connected at said end sections and spring biased away from each other by means of a gas spring pivotally connected to both sections, the pivot connections of said gas spring and the pivot connection of the two sections of each arm forming a triangular array;

the arms, gas spring, and the pivot connections of the gas spring providing a lifting force slightly less than the force required to lift the cap from said closed position.

2. The truck box cap of claim 1 further comprising a flexible fabric depending from said cap, and means attached to the fabric for securing the fabric to the cap and truck box.

* * * * *